(12) United States Patent
Koops et al.

(10) Patent No.: US 7,939,164 B2
(45) Date of Patent: May 10, 2011

(54) PIGMENT LAYER AND METHOD OF PERMANENTLY SCRIBING A SUBSTRATE BY MEANS OF HIGH-ENERGY RADIATION

(75) Inventors: Arne Koops, Neu-Lankau (DE); Sven Reiter, Hamburg (DE); Jochen Stähr, Itzehoe (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 12/350,765

(22) Filed: Jan. 8, 2009

(65) Prior Publication Data
US 2009/0181231 A1 Jul. 16, 2009

Related U.S. Application Data

(63) Continuation-in-part of application No. 12/013,588, filed on Jan. 14, 2008.

(30) Foreign Application Priority Data

Jan. 11, 2008 (DE) .......... 10 2008 004 130
May 28, 2008 (DE) .......... 10 2008 025 583

(51) Int. Cl.
*B32B 7/02* (2006.01)
(52) U.S. Cl. ........ 428/212; 428/220; 428/343; 428/432; 427/7; 523/160
(58) Field of Classification Search .......... 428/212, 428/220, 343, 432; 427/7; 523/160
See application file for complete search history.

(56) References Cited

U.S. PATENT DOCUMENTS

| | | | |
|---|---|---|---|
| 4,753,504 A | 6/1988 | Kyogoku | |
| 5,120,383 A | 6/1992 | Takei et al. | |
| 5,998,010 A * | 12/1999 | Schlueter et al. | 428/323 |
| 6,313,436 B1 | 11/2001 | Harrison | |
| 7,554,101 B2 * | 6/2009 | Tahon et al. | 250/484.4 |
| 2004/0048175 A1 | 3/2004 | Bobeck et al. | |

FOREIGN PATENT DOCUMENTS

| | | |
|---|---|---|
| DE | 691 00 363 T3 | 5/1994 |
| DE | 101 52 073 A1 | 5/2003 |
| DE | 102 13 110 A1 | 10/2003 |
| DE | 102 13 111 A1 | 10/2003 |
| DE | 10 2004 057 918 A1 | 6/2006 |
| DE | 603 04 897 T2 | 12/2006 |
| DE | 10 2006 045 495 A1 | 3/2008 |
| EP | 03 91 848 A1 | 10/1990 |
| EP | 1 075 963 A1 | 2/2001 |
| JP | 02 271919 | 11/1990 |

OTHER PUBLICATIONS

Zergioti et al; "Growth of TiB2 and TiC coatings using pulsed laser deposition"; Elsevier Science—Thin Solid Films 303 (1997) pp. 39-46 XP004087610.
Marie-Paule et al; "Deposition of titanium carbide films from mixed carbon and titanium plasma streams"; J. Vac. Sci. Technol. A 15 (4) (Jul./Aug. 1997) pp. 1943-1950 XP002525286.
D'Anna et al; "Titanium carbide film deposition on silicon wafers by pulsed KrF laser ablation of titanium in low-pressure C4 and C2H2 atmospheres"; The European Physical Journal Applied Physics; 28, (2004) pp. 159-163 XP002525287.
Zergioti et al; "Microdeposition of metals by femtosecond excimer laser"; Applied Surface Science 127-129 (1998) pp. 601-605 XP002525288.
Vrancken, "mechanismus der Strahlungshartung bzw. Strahlungstrocknung von Uberzugen und Druckfarben"; Farbe und Lack, 83, Jahrg., No. 3, 1977 (referred to on p. 9 of specification).
Ullmanns Encyklopadie der technischen chemi; vol. 12, pp. 525-555, 4th edition, 1976 (referred to on p. 15 of specification).

* cited by examiner

*Primary Examiner* — Mark Ruthkosky
*Assistant Examiner* — Lawrence D Ferguson
(74) *Attorney, Agent, or Firm* — Norris McLaughlin & Marcus, P A (57) ABSTRACT

Pigment layer intended particularly for the permanent marking of glass, based on a polymer matrix which reacts predominantly with pulverization to a high-energy beam, more particularly to laser irradiation, comprising at least one titanium donor and a carbon donor which provides free carbon under energy irradiation.

19 Claims, 4 Drawing Sheets

PIGMENT LAYER AND METHOD OF PERMANENTLY SCRIBING A SUBSTRATE BY MEANS OF HIGH-ENERGY RADIATION

This application is a Continuation-in-Part of U.S. patent application Ser. No. 12/013,588, filed Jan. 14, 2008, now pending and claims foreign priority benefit under 35 U.S.C. §119 of the German Patent Application Nos. 10 2008 004 130.0 filed Jan. 11, 2008 and 10 2008 025 583.1 filed May 28, 2008.

The invention relates to a pigment layer as described in greater detail hereinbelow and to a method of permanently scribing a substrate, more particularly glass, by means of high-energy radiation.

For the identity marking of components on vehicles, machinery, electrical and electronic devices or of parts composed, for example, of glass, one of which is to use technical labels, as, for instance, model identification plates, process control labels, guarantee badges and testing plaquets. Identity marking by means of laser labels and printed or coated metal plates possesses an increasing status particularly for high-value marks. In this way, information and advice for the subsequent user is located on a wide variety of parts.

Besides these methods, this information can also be ensured by scribing directly on the article to be scribed. For the direct scribing and identity marking of metals or glass, in particular, there are various known scribing methods. Scribing may take place, for example, by means of application of material, such as with ink, or else with removal of material, such as in the case of engraving.

The scribing of labels, or direct scribing, may take place in the form, for example, of a 1-D or 2-D bar-code. A suitable read device provides the option, through the barcode, of reading information concerning the scribed product or its contents. As well as this standard information, however, sensitive security data are often also located in the scribe mark. In the event of theft, accident or guarantee, this information is very important for the recovery of product and contents.

For direct scribing in particular, powerful and controllable lasers for burning marks such as alphanumeric identifications, codes and the like are widespread. Requirements imposed on the material to be scribed or to be used for scribing, and also on the scribing method, include the following:

The material shall be rapidly scribable.
A high spatial resolution capacity shall be attained.
Material and scribing method shall be extremely easy to use.
Any decomposition products formed in the course of scribing shall not have a corrosive action.
The scribing method shall have little or no effect on the mechanical stability of the component.

Furthermore, special cases, depending on the particular field of use, require additional characteristics, such as the following:

The symbols produced by means of irradiation shall be of such high contrast that they can be read faultlessly from far distances, for example, even under adverse conditions.
The scribe mark shall have a high level of temperature stability, to more than 200° C., for example.
The scribe mark shall have a high level of resistance to external influences, such as the effects of weathering, water and/or solvents.

If scribe marks are applied to the component not with a (laser) label but instead by means of direct imprinting, it is an easy possibility for third parties to remove the scribe mark by washing or rubbing. Often, moreover, the simple rubbing of the scribed article against a second article, a pack for example, is enough to weaken the individual letters or numbers.

Glass surfaces are identity-marked typically by the conventional sandblasting technique and laser engraving. The resulting identity marking possesses low contrast and is generated by removal of glass material, which entails altering the mechanical stability.

Also known is the evaporation of material by means of a laser, referred to as the LTF method (laser transfer film) or as PLD (pulsed laser deposition). With both methods there is deposition of the evaporated material on the target substrate. The evaporated material forms a physicochemical bond to the target substrate.

DE 101 52 073 A discloses a laser transfer film for the permanent inscription of components. This laser transfer film has a carrier layer, an adhesive layer being present at least partially on the bottom face of the carrier layer. Furthermore, a pigment layer is applied at least partially on the carrier layer and/or adhesive layer, the said pigment layer comprising a laser-sensitive pigment. Examples of suitable pigments are color pigments and metal salts. Use is made more particularly of pigments from Thermark, an example being Thermark 120-30F, which are metal oxides, molybdenum trioxide for example. It is possible, furthermore, to use mixtures of two or more pigments or blends of pigments and glass particles, of the kind available from the company Merck and Ferro Inc., and these may lead to a sintering operation. Suitability is further possessed by various pigments from the company Merck (examples being the pearlescent pigments EM 143220 and BR 3-01). The laser-sensitive pigment may also, furthermore, be used in addition to the titanium dioxide additive.

DE 102 13 110 A1 describes a multi-layer laser transfer film for the permanent inscription of components, comprising at least one carrier layer, a first adhesive layer again being present at least partially on the bottom face of the carrier layer. Furthermore, on this side of the carrier layer, on which the first adhesive layer is located, there are now at least two pigment layers present. The pigment layers preferably comprise an at least partly applied first pigment layer, comprising at least one glass flux pigment, and an at least partially applied second pigment layer, comprising at least one laser-sensitive pigment. In one advantageous embodiment the first pigment layer comprises a glass flux pigment and an absorber, and/or the second pigment layer comprises a glass flux pigment, an absorber and a laser-sensitive pigment.

DE 102 13 111 A1 describes a multi-layer laser transfer film for permanently scribing components, comprising at least one carrier layer, there being a first adhesive layer present at least partially on the bottom side of the carrier layer. On the side of the carrier layer on which the first adhesive layer is located there are likewise present, at least partially, at least two pigment layers comprising a laser-sensitive pigment. The concentration of the laser-sensitive pigment within each of the pigment layers, however, is different.

U.S. Pat. No. 6,313,436 B describes a heat-activated chemical marking method wherein a layer of mixed metal oxide is applied to a metal substrate. This layer comprises an energy absorption enhancer. Following its application, the layer is irradiated with an energy beam bundle to match the form of the marking that is to be applied. The energy beam bundle has a wavelength tuned to the energy absorption enhancer, and so excites this enhancer, and a marking layer is formed atop the substrate.

In principle, it is possible to produce different effects by an irradiation of energy, more particularly by the interaction between a laser beam and a material. The machining of a material of construction is based in this context on the thermal exposure which develops from the conversion of the irradiated energy (radiation energy) into heat. Critical for the machining of a material of construction in this context is the fraction of the intensity that is absorbed by the material, with degree of reflection and degree of absorption being dependent on the irradiated wavelength and on the material of construction itself. Since the majority of materials for construction that have been machined are good thermal conductors, the irradiated energy is spread very rapidly and there is little scattering of heat around the irradiated laser spot. In the case of metals this effect is used for tamper inscription, by using the deliberate heating to change the microstructure of the metal and so, by oxidation, to produce a discoloration. The coloration depends on the maximum temperature attained in the boundary layer. In this way it is possible, depending on laser parameters, to create lighter and darker tamper colors. In contrast, the absorption behavior of plastics is moderate and is determined largely by fillers, processing aids, additives, dyes, pigments, and the nature of the surface. A plastic, as a poor thermal conductor, may react to a laser beam by melting, foaming, bleaching, discoloring and etching. Particularly in the case of thermoplastics and elastomers, a melting process is generated in the case of laser radiation, since more laser power is absorbed than can be transported away by thermal conduction. Local over-heating occurs in the form of a liquefaction, or, above a critical intensity, there is evaporation of the plastic material. A melt, however, is of only limited suitability for the permanent marking of substrates.

It is an object of the present invention to provide a pigment layer intended for the permanent scribing of substrates, more particularly of glass, which allows rapid and precise scribing and, in so doing, enhances anti-counterfeit security. The scribing shall, moreover, be benign for the component, shall be not removable without destruction, and yet shall permit high contrast, high resolution capacity and high temperature stability.

This object is achieved in the case of a pigment layer having the features described in greater detail hereinbelow.

The invention accordingly provides a pigment layer intended for the permanent marking of a substrate, more particularly of glass, which is based on a polymer matrix. As well as the polymer matrix, the pigment layer comprises a titanium donor as a further constituent. A titanium donor in this context is pure titanium or a titanium compound which has an affinity to provide free titanium as a reactant, at any rate in the short term, under exposure to energy. If appropriate, the provision of the free titanium may also take place via the route of a titanium-containing intermediate. Further provided is a carbon donor, in other words a material which, under energy irradiation, provides free carbon—that is, carbon which is not attached chemically. This may be an additional carbon compound to the polymer matrix; where appropriate, however, the polymer matrix itself may also be sufficient as a source of free carbon.

For the present invention it is essential that the polymer matrix reacts with pulverization when irradiated with high-energy radiation, such as laser radiation, for example. During the pulverization, free carbon is formed and the titanium compound is cleaved. The marking deposited in this process is a new titanium compound, more particularly titanium carbide, on the substrate to be marked. With a sufficiently high concentration of free carbon, this as well is incorporated in the new titanium compound, thus allowing the contrast of the mark to be influenced in a specific way.

This laser-induced pulverization is achieved preferably in the case of brittle materials. When the power is sufficiently high, a vapor capillary is formed in conjunction with a plasma. Through the capillary, the absorption takes on substantially higher values, and so the laser radiation is able to penetrate more deeply into the material and can explosively remove the plastic material in particle form from the matrix around the zone of thermal influence. This effect can be utilized optimally for the production of the transfer material, with this capillary serving as a reactant space, and the resulting powder is reacted as a titanium donor and carbon donor for the synthesis of titanium carbide.

A polymer matrix in the present case is the term for any matrix based on polymeric constituents. Besides the polymer constituents, the matrix may also comprise any desired non-polymeric constituents; only the main constituent should be polymeric in nature. More particularly the term "polymer matrix" also refers to a mixture of base polymers. In a particularly preferred embodiment the polymer matrix is a thermoset polymer matrix. It has emerged that thermosets in particular are especially suitable for obtaining pulverization.

In a preferred embodiment the pigment layer is formed free from plastics which melt under energy radiation, and in particular is also formed free from other melting materials. By this means it is possible on the one hand to keep the structure of the product extremely simple, and on the other hand the scribing is not adversely affected by the melting of plastic or other materials. Furthermore, in the case of the present pigment layer, it is also possible to do without a glass frit constituent. Surprisingly it has emerged that a durable bond of the mark to glass in particular is achieved even without a glass frit.

According to one first advantageous embodiment of the invention the titanium compound is titanium dioxide, preferably in rutile structure. The rutile structure is one of the four crystal polymorphs of titanium dioxide, as is known from the technical literature. The titanium dioxide pigments in rutile structure have a refractive index, n, of 2.75 and absorb fractions of visible light even at wavelengths around 430 nm. They have a hardness of 6 to 7.

In a further-preferred embodiment the pigment layer contains carbon black or graphite for the provision of the free carbon that is needed for the synthesis of titanium carbide. The carbon black cleaves under energy irradiation, more particularly under laser irradiation, and, in so doing, forms free carbon. Furthermore, the free carbon may also originate from the polymer matrix decomposed, evaporated, oxidized, depolymerized and/or pyrolyzed on exposure to energy, more particularly by laser irradiation.

Preference is given to using neutral carbon black with a pH of 6 to 8. This is preferred more particularly in respect of ease of handling and for the avoidance of special safety precautions involved with acidic or basic materials. Preferred suitability is possessed predominantly by thermal black, acetylene black and lamp black. Lamp black is particularly preferred. The pH of lamp black is typically 7 to 8, that of thermal black 7 to 9, and that of acetylene black 5 to 8. The pH of furnace blacks is situated typically at 9 to 11, and they are therefore very basic. Oxidized gas blacks have a pH situated typically at 2.5 to 6, and are therefore acidic. The use of such acidic or basic carbon blacks, however, is not ruled out in principle.

The stated pigment blacks are extremely resistant to chemicals and are distinguished by high light fastness and weathering resistance. On account of the very high depth of color and color strength, and also of other specific properties, pigment blacks are the most frequently used black pigments. Pigment blacks are manufactured industrially by thermooxidative or thermal cleavage of hydrocarbons. Pigment blacks are produced almost exclusively by the furnace black process, Degussa gas black process or lamp black process, these processes being known from the literature.

According to another advantageous embodiment of the invention the polymer matrix is a radiation-cured polymer matrix. The polymer matrix is composed advantageously of a varnish, more particularly of a cured varnish, preferably a radiation-cured varnish, with particular preference an electron beam-cured aliphatic, difunctional polyurethane acrylate varnish. In one alternative embodiment the polymer matrix is composed of polyester acrylate. This cured varnish has a very high hardness and a high level of brittleness.

In principle there are four types of varnish which can be used advantageously for the polymer matrix, provided that their stability is sufficient: for example, acid-curing alkyd-melamine resins, addition-crosslinking polyurethanes, free-radically curing styrene varnishes and the like. Particular advantage, however, is possessed by radiation-curing varnishes, on account of their very rapid curing without lengthy evaporation of solvents or exposure to heat. Varnishes of this kind have been described, for example, by A. Vrancken (Farbe und Lack 83, 3 (1977) 171).

According to one particularly advantageous embodiment of the invention the composition of the pigment layer is as follows:

| | |
|---|---|
| 100 phr | polymer matrix, more particularly a radiation-cured aliphatic, difunctional polyurethane acrylate, |
| 0.2 phr to 2.5 phr | carbon black and |
| 45 phr to 65 phr | titanium dioxide. |

"phr" here denotes "parts per hundred resin", a unit commonplace in the polymer industry for the purpose of characterizing compositions of mixtures, with all of the polymeric ingredients (in this case, therefore, the polymer matrix) being set at 100 phr.

With further preference the composition is as follows:

| | |
|---|---|
| 100 phr | polymer matrix, more particularly a radiation-cured aliphatic, difunctional polyurethane acrylate, |
| 0.4 phr | carbon black and |
| 63.2 phr | titanium dioxide. |

The thickness of the pigment layer is situated advantageously in a range from about 20 μm to about 500 μm, more particularly in a range from about 30 μm to about 100 μm, in order to meet with outstanding effect the requirements imposed on it.

The properties can be optimized by blending the pigment layer with one or more additives such as plasticizers, fillers, pigments, UV absorbers, light stabilizers, ageing inhibitors, crosslinking agents, crosslinking promoters or elastomers.

When the high-energy radiation, more particularly a laser beam, strikes the pigment layer, said layer is disintegrated essentially into small particles in the region of the point of strike, and so the pulverized material removed from the pigment layer by laser-generated burning has a number-average particle size of 0.5 to 2.0 μm.

When irradiation is carried out using high-energy radiation such as laser radiation, in the form for example of a laser pulse, the radiation or laser light comes directly into contact or interaction with the surface of the pigment layer, and leads to pulverization of the polymer matrix. In the case of a laser beam, the beam is coupled into the material by absorption. The absorption has the effect that material is evaporated, that particles are extracted from the pigment layer, and that a plasma may be formed. Particularly at the margins of the laser beam exposure there are thermal melting processes occurring.

Typically, when the irradiated energy is converted into heat, long-chain polymer constituents of the pigment layer are cleaved, and the products of thermal cracking include elemental carbon. In summary, the polymer matrix undergoes particulation/evaporation/decomposition as a result of the high energy input.

This carbon is deposited in the form of titanium carbide on the product to be scribed. The emission constituents at the time of scribing are therefore the elemental carbon, the $TiO_2$ and the cracking products from the polymer matrix of the pigment layer. The following reaction may reflect the process, which can be described as a carbothermal synthesis reaction for the preparation of titanium carbide.

The energy input is determined by the interaction coefficient of the reactants, in particular their absorption characteristics, and also by the nature of the radiation and the parameterization of the radiation source. Following selection of the suitable radiation source, more particularly a laser, control is implemented primarily via the radiant output and the scribing speed.

Titanium carbide (also identified as TiC) is a member of the non-oxide ceramics. Non-oxide ceramics are distinguished by relatively high covalent and low ionic bonding components, with high chemical and thermal stability as compared with the silicate ceramics and oxide ceramics. Industrial titanium carbide contains around 19.5% by mass of bonded carbon and up to 0.5% by mass of unbonded carbon, referred to as free carbon. The theoretical stoichiometric carbon content is 20.05% by mass.

Figure 4:
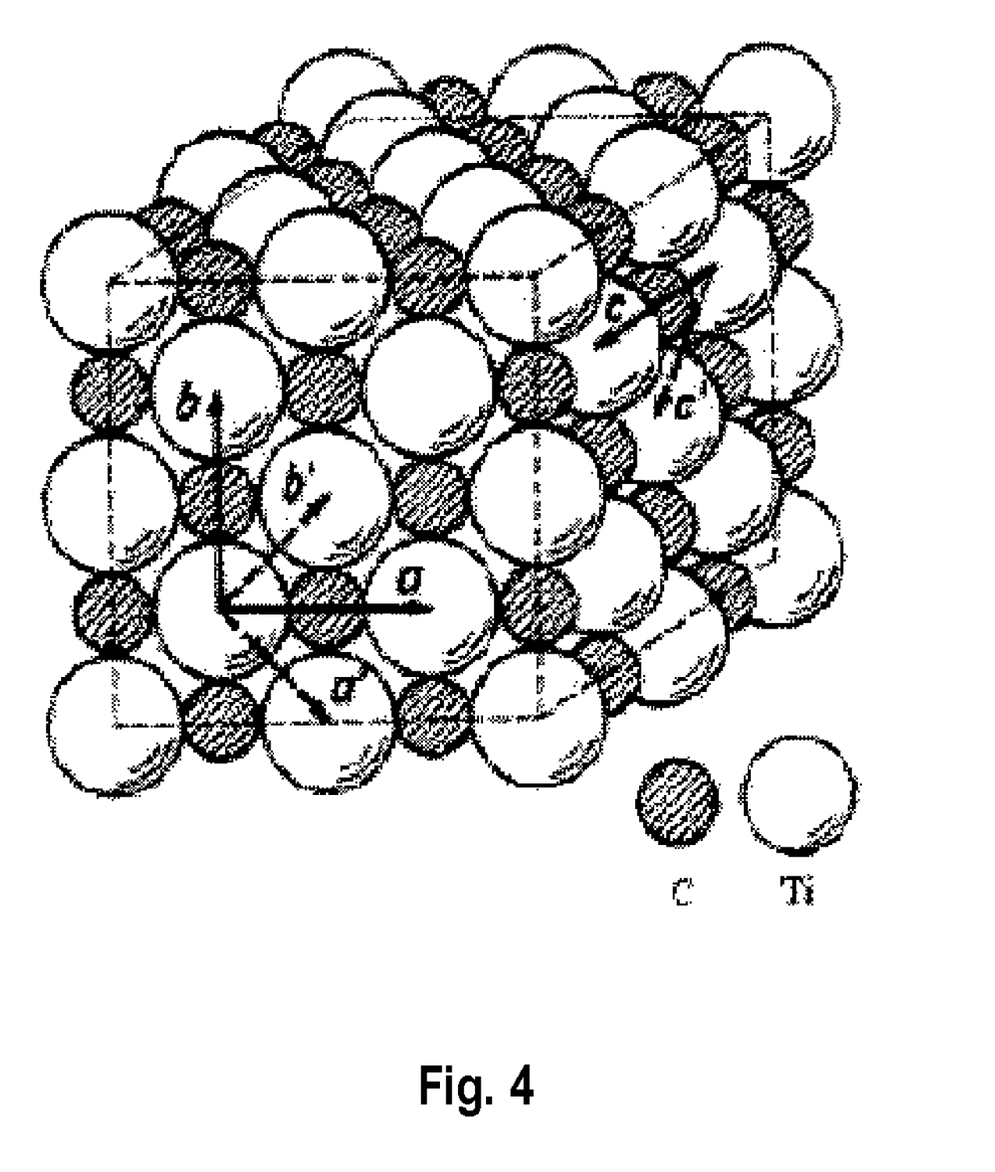
FIG. 4 shows the crystal structure of titanium carbide.

The properties of titanium carbide compound (TiC) are as follows:

| | |
|---|---|
| Color: | grey metallic |
| Melting point: | 3157° C. |
| Density: | 4.93 g/cm$^3$ |
| Crystal structure: | cubic, possessing closest sphere packing, when all of the octahedral gaps are filled: TiC (see FIG. 4) |

The following properties/advantages in particular are associated with titanium carbide:
  a relatively high hardness and hence resistance to abrasion and wear
  a very high heat resistance
  corrosion stability
  good biocompatibility
  ferroelectric properties
  low thermal conductivity (when the carbon fraction is high)
  electrical semiconduction
  resistance to cold acids and alkalis As a result of the formation of inclusion compounds or interstitial compounds (occupying of lattice interstices), it is possible for small carbon atoms to be intercalated at lattice interstices or spaces in the crystal lattice, these atoms then giving the titanium carbide a black color. This results, ultimately, in a high-contrast black scribe marking on the substrate that is to be scribed.

In other words, the very high-contrast scribe marking on the substrate to be inscribed comes about as a result of the fact that titanium carbide is deposited on the substrate, the spaces in the crystal lattice being penetrated by free carbon atoms which originate, for example, from the carbon black or from the cracked elemental carbon from the polymer matrix.

According to a further advantageous embodiment of the invention, the pigment layer is coated partially or over its whole area with an adhesive, more particularly a pressure-sensitive adhesive. An embodiment of this kind is particularly advantageous for allowing ease of use of the pigment layer. By means of the (partial) adhesive layer formed in this way, the pigment layer can be fixed simply, during the inscribing process, on the substrate that is to be marked, without a risk of displacement of the pigment layer.

In particular the adhesive layer may be applied in the form of dots or by screen printing, where appropriate also in the form of marginal printing, and so the pigment layer can be bonded to the substrate in any desired way.

The adhesive in question is preferably a pressure-sensitive adhesive (PSA). The pigment layer is coated on one or both sides with the preferred PSA in the form of a solution or dispersion or in 100% form (for example from the melt). The adhesive layer or layers can be crosslinked by means of heat or high-energy radiation and, where necessary, can be lined with release film or release paper. Suitable PSAs are described in D. Satas, Handbook of Pressure Sensitive Adhesive Technology (Van Nostrand Reinhold). Suitability is possessed in particular by PSAs based on acrylate, natural rubber, thermoplastic styrene block copolymer or silicone.

For the optimization of the properties it is possible for the self-adhesive composition employed to be blended with one or more additives such as tackifiers (resins), plasticizers, fillers, pigments, UV absorbers, light stabilizers, ageing inhibitors, cross-linking agents, crosslinking promoters or elastomers. The formulation of the adhesive is guided in particular by the intended use, in other words by the nature of the bonding substrate, the prospective period of bonding, the ambient conditions, etc.

Suitable elastomers for blending are, for example, EPDM rubber or EPM rubber, polyisobutylene, butyl rubber, ethylene-vinyl acetate, hydrogenated block copolymers of dienes (for example, through hydrogenation of SBR, cSBR, BAN, NBR, SBS, SIS or IR; such polymers are known, for example, as SEPS and SEBS) or acrylate copolymers such as ACM.

Suitable tackifiers are, for example, hydrocarbon resins (formed for example from unsaturated $C_5$ or $C_7$ monomers), terpene-phenolic resins, terpene resins from raw materials such as α- or β-pinene, aromatic resins such as coumarone-indene resins, or resins formed from styrene or α-methylstyrene, such as rosin and its derivatives, such as disproportionated, dimerized or esterified resins, the use of glycols, glycerol or pentaerythritol being possible, and also others, as listed in Ullmanns Enzyklopädie der technischen Chemie, volume 12, pages 525 to 555 (4th edition), Weinheim. Particularly suitable resins are those which are stable to ageing and have no olefinic double bond, such as hydrogenated resins, for example.

Examples of suitable plasticizers are aliphatic, cyclo-aliphatic and aromatic mineral oils, diesters or poly-esters of phthalic acid, trimellitic acid or adipic acid, liquid rubbers (for example, nitrile rubbers or polyisoprene rubbers), liquid polymers of butene and/or isobutene, acrylic esters, polyvinyl ethers, liquid resins and plasticizer resins based on the raw materials for tackifier resins, wool wax and other waxes, or liquid silicones.

Examples of suitable crosslinking agents are phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acid.

The coating thickness with adhesive is preferably in the range from about 5 $g/m^2$ to about 100 $g/m^2$, more particularly from about 10 $g/m^2$ to about 25 $g/m^2$.

With further preference the pigment layer is applied on a carrier, preferably on a carrier sheet. Application is accomplished advantageously by coating the pigment layer onto the carrier.

As the carrier sheet it is possible with preference to use films which are transparent, more particularly monoaxially and biaxially oriented films based on polyolefins, films based on oriented polyethylene or oriented copolymers comprising ethylene units and/or polypropylene units, and also, where appropriate, PVC films and/or films based on vinyl polymers, polyamides, polyesters, polyacetals or polycarbonates. PET films as well are outstandingly suitable as carriers. Films based on oriented polyethylene or oriented copolymers containing ethylene units and/or polypropylene units as well are suitable as a carrier sheet.

Preference extends to single-layer biaxially or mono-axially oriented films and multi-layer biaxial or mono-axial films based on polypropylene. Films based on unplasticized PVC can be used, as can films based on plasticized PVC. Polyester-based films, such as poly-ethylene terephthalate, for example, are likewise known and are suitable as carriers of the pigment layer.

It is also possible for parts of the pigment layer to have been deactivated by means of a partially applied passivating layer, specifically on the side which in the course of the marking operation is in contact with the substrate. By this means it is possible to prevent marking of the substrate in certain regions even from the outset. Passivation may take place, for example, in the form of a negative of the desired marking, so that the marking itself can take place subsequently by means of aerial irradiation.

The pigment layer with or without carrier sheet and/or adhesive coating and with all further layers may for the purposes of this invention be present in the form of all sheetlike structures, such as two-dimensionally extended films or film sections, tapes with extended length and limited width, tape sections, diecuts, labels and the like, for example. Also possible is the winding of a comparatively long pigment layer to form an Archimedean spiral, from which a section of desired length is separated off form use in each case.

With the pigment layer it is possible to obtain scribed marks having a resolution in the μm order of magnitude.

With further preference the applied marking is an interference hologram, since the resolution quality of the method permits structures for light intensification and light extinction. Alternatively the scribed mark may also be made in the form of a computer-generated hologram. Through calculation of the hologram structure and application of this structure by laser irradiation, a computer-generated hologram allows the identity marking to be individualized, and this identity marking, on account of its format, is difficult to forge and hence affords a high level of anti-counterfeit protection. Moreover, it is easy for information to be introduced in hidden form into a structure of this kind.

Especially when the standard lasers are employed, more especially the widespread Nd-YAG solid-state lasers with a wavelength of 1.06 µm, the scribed markings and identity markings obtained are sharp and of high contrast.

With further preference the pigment layer of the invention can be used in a method of marking a substrate, more particularly glass, the pigment layer being brought by pressing into direct contact with the substrate to be scribed, and the pigment layer being subsequently irradiated with high-energy radiation, and more particularly with a laser. As a result of the irradiation, the polymer matrix is pulverized, free carbon is formed, and a marking is formed on the substrate in the irradiated regions. In particular, the scribing of glass by means of the above-described pigment layer has proved to be particularly advantageous. Scribing can be done with relatively short exposure times and the scribed mark is joined permanently to the glass. Moreover, the scribing can also be carried out without visible damage to the glass.

The direct contact between pigment layer and substrate avoids an interspace which leads to an enlargement of the reaction space during laser irradiation. The consequence of that would be to allow the deposit on the substrate to be distributed over a larger surface area, so lessening the contour definition of the resulting scribed marking.

This method is suitable more particularly for marking transparent substrates, such as glass, for example, since scribing can take place through the substrate. The radiation therefore penetrates the substrate, or else, possibly, two or more layers of the substrate in the case of a corresponding structure such as a tube, and interacts with the pigment layer disposed on the substrate, as a result of which, as described above, the marking is formed on the side of the substrate remote from the radiation source.

Particularly in the case of the scribed marking of glass, all of the advantages of the pigment layer of the invention are utilized: marking takes place in an extremely resistant way. A very good scribing outcome is obtained. Moreover, the level of fume generated is surprisingly low. Immediately after the scribing process, the indicia exhibit a very high contrast. The unfixed residue can be removed by dry or wet wiping of the identity marking surface.

Application of the pigment layer is preferably preceded by cleaning of the surface to be scribed. In addition it is advantageous if, after the high-energy radiation has been applied, and hence the mark, the substrate surface is cleaned to remove residues and/or the pigment layer that is not needed any longer is removed. It is particularly advantageous in this context if the pigment layer is applied substantially only to regions of the surface that are subsequently to be scribed or marked.

Preference is given to using a diode-pumped solid-state laser, the pulse duration of the laser being between 40 and 90 ns, the initial output being 20 watts and/or the scribing rate being 250 mm/sec to 750 mm/sec, depending on the content of the scribed marking. With a view to the ongoing laser technology, however, even shorter pulse lengths are conceivable, in particular down to pulse durations in the ps or fs range. A pulse duration of this shortness is particularly advantageous in respect in particular of short exposure cycles.

Where the target substrate is glass, the transmission technique is possible, since the wavelength of 1.064 µm that is used is transparent for glass.

The scribed marking which comes about on the glass has a height of 0.25 to 3.0 µm, depending on the content of the scribed marking and on the parameterization. The temperature stability has been shown to be in the range from −50° C. to 1200° C. The low-temperature resistance and heat resistance, however, are significantly higher. The mechanical resistance with respect to abrasion is extremely high (crockmeter test>1000 strokes).

The scribed marking exhibits a high accuracy of resolution, depending on the beam quality used; the line width is 70 µm to 80 µm. It is possible for example to produce machine-readable 2D codes with an edge length of 1.5 mm×1.5 mm and a content of 16 characters. Moreover, it is possible to realize all of the typical content of identity markings, such as logos, pictograms, drawings, alphanumeric symbols, special symbols, and pixel graphics.

The invention also embraces, finally, a glass article marked using the pigment layer of the invention. The term "glass article" encompasses all articles made of glass, especially sheets, containers or tubes, and glass surfaces of generally convex or concave curvature.

The above-described pigment layer and also the corresponding scribed marking method are suitable more particularly for the following fields of application, where reliable identity marking of glass containers in particular is of great importance:

Biotechnological, medical and pharmaceutical, primary, secondary and tertiary packaging materials made of glass Packaging materials made of glass for chemicals, auxiliaries, foodstuffs and semi-luxury products Containers and/or components made of glass for surgical, therapeutic and diagnostic procedures Containers and/or components for industrial and analytical processes (pipettes, pH meters, etc.)

Containers and/or components for biological methods relating to active/inert cell material In the text below, an example is used to illustrate the composition of a polymer layer in more detail, without any restrictive effect whatsoever:

| Substrate | Fraction [phr] |
| --- | --- |
| EB 284 | 85.1 |
| HDDA | 5.0 |
| DVE 3 | 9.9 |
| Carbon black | 0.4 |
| Titanium dioxide | 63.2 |
| Sum total | 163.6 |

| | |
| --- | --- |
| EB 284: | Aliphatic, difunctional polyurethane acrylate (manufacturer: Cytec) |
| HDDA: | Hexanediol diacrylate (manufacturer: BASF) |
| DVE 3: | Divinyl ether (manufacturer: ISP or BASF) |
| Carbon black: | Furnace black with a particle size of 56 nm, surface area 45 m$^2$/g (manufacturer: Evonik, Printex 25) |
| TiO$_2$: | (Manufacturer: Kronos, Kronos 2160) |

The composition is coated out to give a layer having a thickness of 100 µm. Sections measuring 30×50 mm are produced from the applied coat by punching.

BRIEF DESCRIPTION OF THE DRAWINGS

Finally, using a number of figures, the use of the polymer layer of the invention for scribing a glass article, in one advantageous embodiment, is illustrated in more detail, without any intention thereby to restrict the invention unnecessarily.

Figure 1:
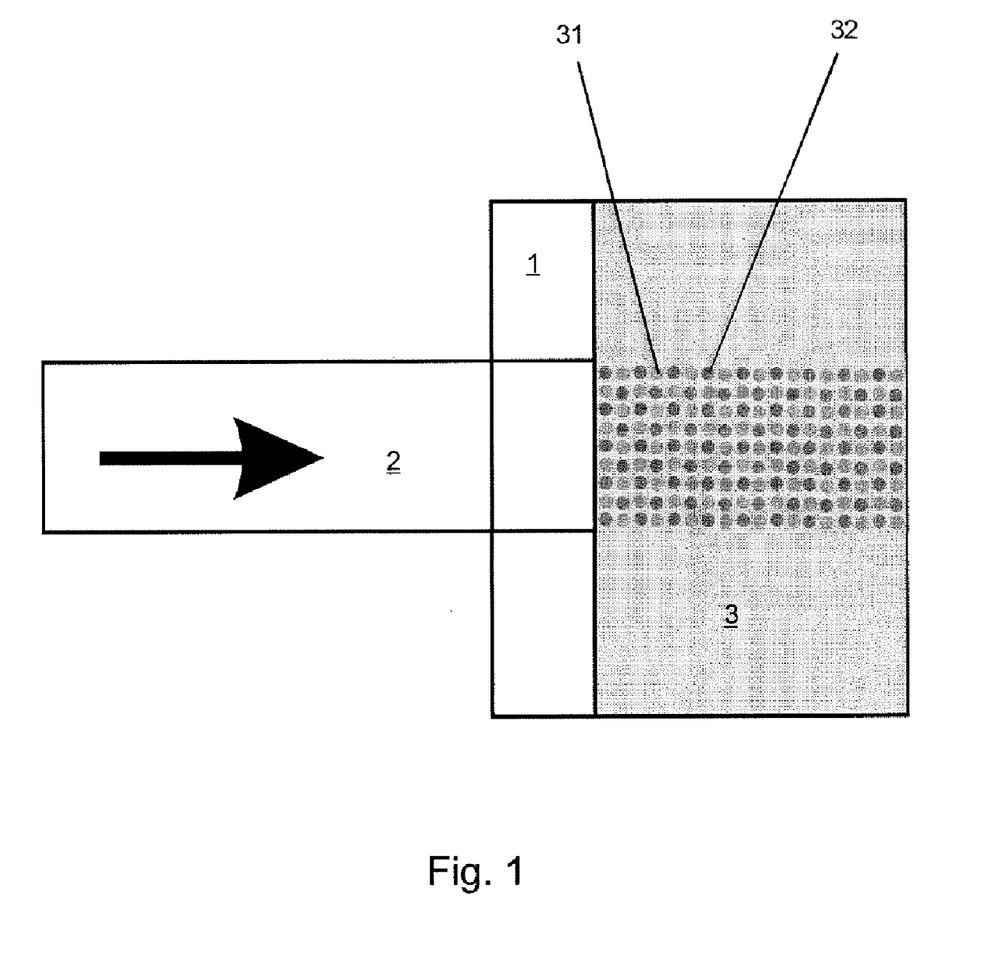
FIG. 1 shows the scribing of a glass article by means of a laser, using the transmission technique and the pigment layer of the invention.

FIG. 1 shows the scribing of a glass article 1 by means of a laser which emits a laser beam 2, using the transmission technique and the pigment layer 3 of the invention.

The laser used is an Nd:YAG laser with a wavelength of 1.064 µm which is transparent for the glass article 1. The laser beam 2 therefore passes through the glass article 1 and strikes the pigment layer 3, which is in direct contact with the glass article 1. The pigment layer 3 is composed of a polymer matrix, with the titanium dioxide 31 and carbon black 32 incorporated therein by mixing.

Figure 2:
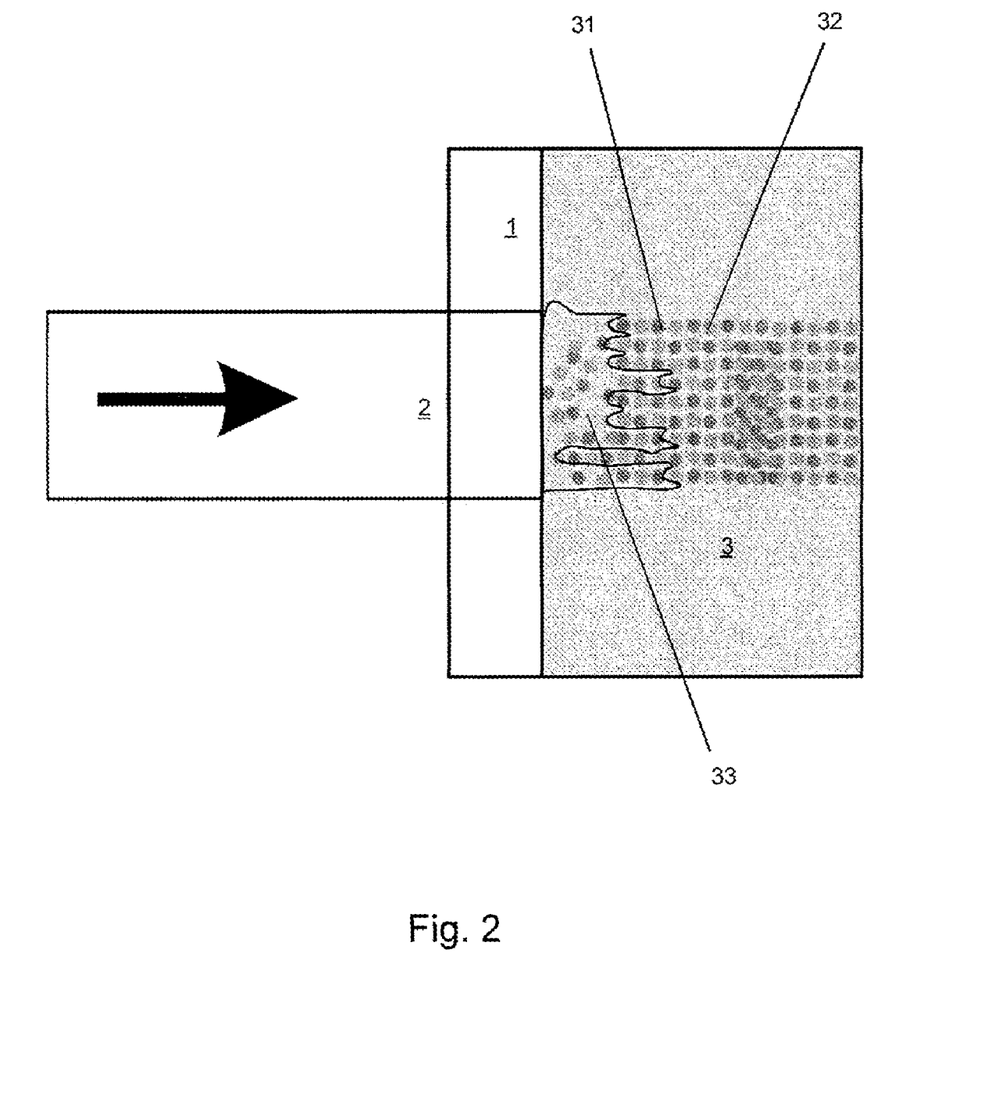
FIG. 2 shows the process of pulverization and subsequent evaporation of the polymer matrix of the pigment layer at the point where the laser strikes.

FIG. 2 shows the process of evaporation, with pulverization beforehand, of the polymer matrix of the pigment layer 3 at the point where the laser strikes. The striking of the laser light 2 on the pigment layer 3 converts the laser light 2 into heat, which acts on the surface of the pigment layer 3. The polymer matrix, as a result of absorption of the laser light 2, is converted locally into a plasma 33, also called a plasma cloud.

Figure 3:
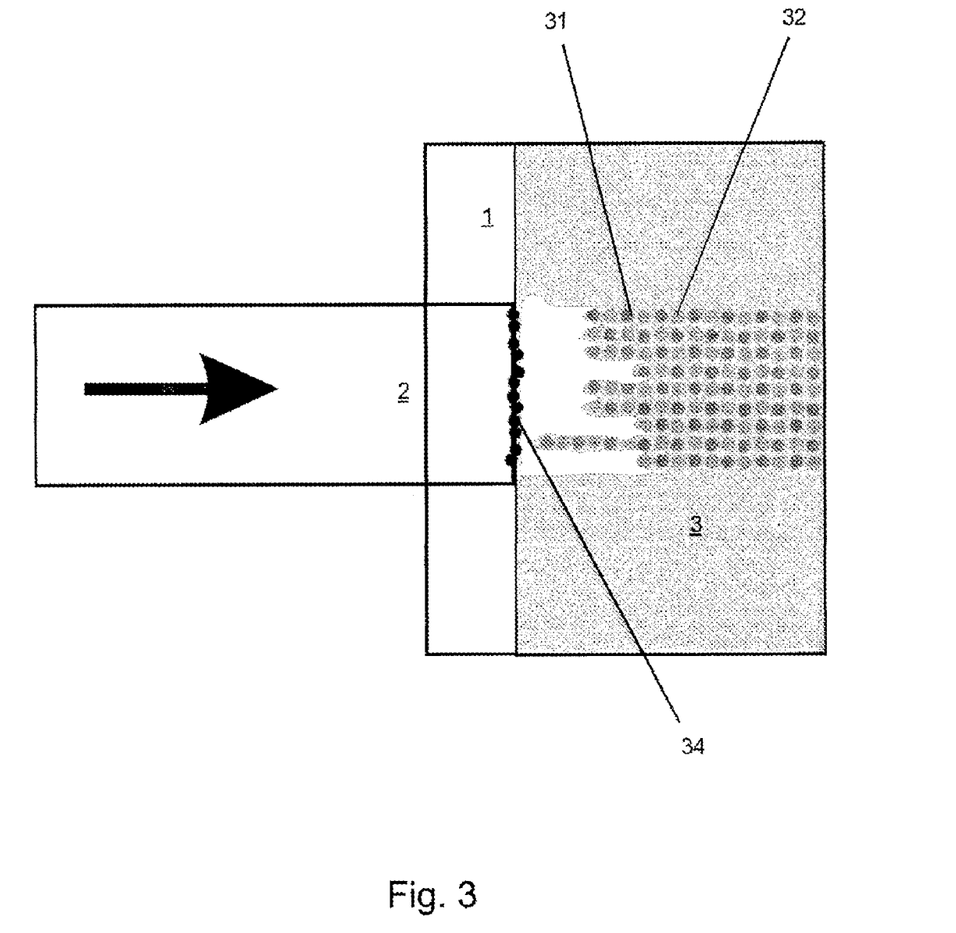
FIG. 3 shows the formation of the scribed marking on the glass article by titanium carbide.

As a result of the formation of the plasma 33 a reaction takes place between the titanium dioxide 31 and the carbon black 32, to give titanium carbide 34, which, as shown in FIG. 3, is deposited on the surface of the glass article 1.

What is claimed is:

1. Pigment layer intended for the permanent marking of a substrate, based on a polymer matrix which reacts predominantly with pulverization to high-energy radiation, wherein the pigment layer has the following composition:

| | |
|---|---|
| 100 phr | polymer matrix, |
| 0.2 phr to 2.5 phr | carbon black and |
| 45 phr to 65 phr | titanium dioxide. |

2. Pigment layer according to claim 1, which is formed free from plastics which melt under energy irradiation and/or free from a glass frit.

3. Pigment layer according to claim 1, wherein the polymer matrix functions as a carbon donor, free carbon originating from the polymer matrix decomposed, evaporated, oxidized, depolymerized and/or pyrolysed under exposure to radiation.

4. Pigment layer according claim 1, wherein the polymer matrix is a radiation-cured polymer matrix.

5. Pigment layer according to claim 1, wherein the polymer matrix is a thermoset polymer matrix.

6. Pigment layer according claim 1, which has a thickness of the pigment layer in a range from about 20 µm to about 500 µm.

7. Pigment layer according to claim 1, wherein the pulverized material removed from the pigment layer by means of energy irradiation has a number-average particle size of about 0.5 µm to about 2.0 µm.

8. Pigment layer according to claim 1, which is coated partially or over its whole area with an adhesive.

9. Pigment layer according to claim 1, which is applied on a carrier.

10. Pigment layer according to claim 1, which is deactivated as a result of a partially applied passivating layer, the passivation being on the side of the pigment layer that, during the marking operation, is in contact with the substrate.

11. A method of marking glass comprising applying a pigment layer according to claim 1 to the glass.

12. Method according to claim 11, wherein the applied marking is a computer-generated hologram or an interference hologram.

13. Method of marking a substrate, said method comprising bringing a pigment layer by pressing into direct contact with the substrate to be scribed, the pigment layer being formed according to claim 1,
and irradiating the pigment layer with high-energy radiation, as a result of which the polymer matrix is pulverized and free carbon is formed, and
wherein, as a result of the irradiation, a marking is formed on the substrate.

14. Method according to claim 13, wherein the marking is carried out with exclusion of a glass frit and/or with exclusion of a plastic which melts under energy irradiation.

15. Method according to claim 13, wherein a transparent substrate is marked, the irradiation taking place through the substrate and the marking being formed on the side of the substrate that is remote from the radiation source.

16. Method according to claim 13, wherein the irradiation is carried out by means of a laser as radiation source.

17. Method according to claim 13, wherein the irradiation is carried out with a pulse duration of less than 90 ns.

18. Glass article marked using a pigment layer according to claim 1.

19. Glass article according to claim 18, which has titanium carbide on its surface.

* * * * *

UNITED STATES PATENT AND TRADEMARK OFFICE
CERTIFICATE OF CORRECTION

| | | |
|---|---|---|
| PATENT NO. | : 7,939,164 B2 | |
| APPLICATION NO. | : 12/350765 | |
| DATED | : May 10, 2011 | |
| INVENTOR(S) | : Arne Koops, Sven Reiter and Jochen Stähr | |

It is certified that error appears in the above-identified patent and that said Letters Patent is hereby corrected as shown below:

In the Specification

Column 6, line 23, "Tic" should read -- TiC --.

Signed and Sealed this
Third Day of December, 2013

Margaret A. Focarino
*Commissioner for Patents of the United States Patent and Trademark Office*